US010972031B2

(12) United States Patent
Valdivia Guerrero et al.

(10) Patent No.: US 10,972,031 B2
(45) Date of Patent: Apr. 6, 2021

(54) ACTIVE STABILIZATION OF DC LINK IN MOTOR DRIVE SYSTEMS

(71) Applicant: Hamilton Sundstrand Corporation, Charlotte, NC (US)

(72) Inventors: Virgilio Valdivia Guerrero, Roquetas de Mar (ES); Joshua Parkin, Solihull (GB); Thomas Gietzold, Stratford upon Avon (GB); Grzegorz Popek, Birmingham (GB); Daniel Diaz-Lopez, Madrid (ES)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 78 days.

(21) Appl. No.: 16/031,018

(22) Filed: Jul. 10, 2018

(65) Prior Publication Data
US 2019/0089281 A1 Mar. 21, 2019

(30) Foreign Application Priority Data
Sep. 15, 2017 (EP) .................................... 17191468

(51) Int. Cl.
*H02P 21/14* (2016.01)
*H02P 21/05* (2006.01)
*H02P 23/04* (2006.01)
*H02P 21/20* (2016.01)
*H02P 27/12* (2006.01)

(52) U.S. Cl.
CPC ............ *H02P 21/05* (2013.01); *H02P 21/141* (2013.01); *H02P 21/20* (2016.02); *H02P 23/04* (2013.01); *H02P 27/12* (2013.01); *H02P 2201/03* (2013.01)

(58) Field of Classification Search
CPC .... H02P 21/05; H02P 21/141; H02P 2201/03; H02P 27/12; H02P 21/20; H02P 23/04
USPC ......................................... 318/400.02; 363/39
See application file for complete search history.

(56) References Cited

U.S. PATENT DOCUMENTS

| 5,132,894 | A | 7/1992 | Rozman et al. |
| 6,051,941 | A * | 4/2000 | Sudhoff .................. B60L 50/10 318/140 |
| 6,697,270 | B1 | 2/2004 | Kalman et al. |
| 8,415,914 | B2 | 4/2013 | Baker et al. |

(Continued)

FOREIGN PATENT DOCUMENTS

WO 2017066985 A1 4/2017

OTHER PUBLICATIONS

Extended European Search Report for International Application No. 17191468.2 dated May 3, 2018, 8 pages.

(Continued)

*Primary Examiner* — Eduardo Colon Santana
*Assistant Examiner* — Zemenay T Truneh
(74) *Attorney, Agent, or Firm* — Cantor Colburn LLP

(57) ABSTRACT

The present disclosure provides a system and method that provides active damping at the input of a motor drive system without the need for the hardware used in conventional and RC damping circuits. According to the disclosure a virtual damping network is realised at the input of the motor drive system based on modification of field-oriented control, FOC. More specifically, a control algorithm creates a virtual damping impedance at the motor drive input by applying a damping algorithm to both q and d components of the motor current.

8 Claims, 5 Drawing Sheets

(56) References Cited

U.S. PATENT DOCUMENTS

| | | | |
|---|---|---|---|
| 8,669,743 | B2 | 3/2014 | Rozman et al. |
| 9,509,138 | B2 | 11/2016 | Rozman et al. |
| 2009/0230900 | A1* | 9/2009 | Bae ............. H02P 21/22 318/400.02 |
| 2014/0376283 | A1* | 12/2014 | Rodriguez ......... H02J 3/24 363/39 |
| 2015/0180399 | A1 | 6/2015 | Ahmad |
| 2016/0329714 | A1* | 11/2016 | Li ............. H02J 3/381 |

OTHER PUBLICATIONS

Jon Are Suul et al, "Synchronous Reference Frame Hysteresis Current Control for Grid Converter Applications", IEEE Transactions on Industry Applications, IEEE Service Center, Piscataway, NJ, US, vol. 47, No. 5, Sep. 1, 2011, pp. 2183-2194.

Lee Yongjae et al., "Control Method for Mono Inverter Dual Parallel Interior Permanent Magnet Synchronous Machine Drive System", 2015 IEEE Energy Conversion Congress and Exposition (ECCE), IEEE, Sep. 20, 2015, pp. 5256-5262.

Ramkrishan Maheshwari et al., "An Active Damping Technique for Small DC-Link Capacitor Based Drive System", IEEE Transactions on Industrial Informatics, IEEE Service Center, New York, NY, US, vol. 9, No. 2, May 1, 2013, pp. 848-858.

Sridharan Srikanthan et al., "A Transfer Function Approach to Active Damping of an Induction Motor Drive with LC Filters", 2015 IEEE International Electric Machines & Drives Conference (IEMDC), IEEE, May 10, 2015, pp. 834-840.

A. Riccobono, et al., "Positive Feedforward Control of Three-Phase Voltage Source Inverter for DC Input Bus Stabilization With Experimental Validation", IEEE Transactions on Industry Applications, vol. 49, No. 1, Jan./Feb. 2013, pp. 168-177.

H. Mosskull, "Optimal DC-Link Stabilization Design", IEEE Transactions on Industrial Electronics, vol. 62, No. 8, Aug. 2015, p. 5031-5044.

Lee, et al., "DC-link Voltage Stabilization for Reduced DC-link Capacitor Inverter", IEEE Trans. Ind. App., vo 50, No. 1, Jan.-Feb. 2014., pp. 404-414.

Mohamed, et al. "Decoupled Reference-Voltage-Based Active DC-Link Stabilization for PMSM Drives With Tight-Speed Regulation",IEEE Transactions on Industrial Electronics, vol. 59, No. 12, Dec. 2012, pp. 4523-4536.

P. Liutanakul, et al., "Linear stabilization of a DC bus supplying a constant power load: A general design approach," IEEE Transactions on Power Electronics, vol. 25, No. 2, Feb. 2010, pp. 475-488.

P. Magne, et al. "Large signal 30 stabilization of a DC-link supplying a constant power load using a virtual capacitor: Impact on the domain of attraction," IEEE Transactions on Industry Applications, vol. 48, No. 3, May/Jun. 2012, pp. 878-887.

X. Liu, A. Forsyth, and A. Cross, "Negative input-resistance compensator for a constant power load," IEEE Trans. Ind. Electron., vol. 54, No. 6, pp. 3188-3196, Dec. 2007.

\* cited by examiner

US 10,972,031 B2

ACTIVE STABILIZATION OF DC LINK IN MOTOR DRIVE SYSTEMS

FOREIGN PRIORITY

This application claims priority to European Patent Application No. 17191468.2 filed Sep. 15, 2017, the entire contents of which are incorporated herein by reference.

TECHNICAL FIELD

The present disclosure is concerned with electrical power systems and, more particularly, with improved active damping for a DC link in such a system.

BACKGROUND

Electrical power systems generally convert AC power to DC power for several loads to be powered. For such systems, the AC voltage is rectified into DC voltage for the DC loads. In the rectification process, ripple may occur in the DC voltage link which is conventionally filtered by a capacitor between the AC source and the loads of the DC voltage link. The DC voltage link is also subject to disturbances for various reasons such as switching on/off of loads and power mismatches between power supply and demand. Such power systems are used frequently, for example, in aircraft where a DC power bus supplies power to a plurality of loads/components around the aircraft, e.g. electronic systems, control systems, radar, fans, air conditioning systems etc.

Constant power loads, such as a switched mode power converter, dynamically behave as negative resistors and may introduce a destabilizing effect on a DC link causing significant voltage oscillation due to dynamic interactions with its input filter. The input filter of a switching power converter typically comprises one or several "LC" filter cells made up by inductive "L" and capacitive "C" components. They must provide forward voltage attenuation of AC voltage superimposed on the DC link voltage, attenuate current harmonics resulting from switching and have a low output impedance so as not to adversely affect the stability of the switched mode power converter. If stability issues due to constant-power-load behaviour are found, they are typically addressed either by increasing DC-link capacitance, or by adding damping to the resonance.

Moreover, with motor drives, at least in aircraft, the system needs to show stiffness under input voltage oscillations over a certain frequency range. In the case of DC-fed motor drives, this is problematic when the power supply exhibits an oscillation that is close to, or matches, the resonance frequency of the ripple filter, as large amplification of the oscillation may be reflected at the input terminals of the motor drive. This issue is also typically addressed by adding passive damping into the filter. Most commonly, passive dampers have been a RC circuit connected in parallel with the capacitor of the LC cell to be damped. However, other realizations such as RL dampers or other are also possible. The damper circuit reduces the Q of the ripple filter, reducing the peaking and output impedance. The capacitor in the damping circuit is typically larger than the ripple filter capacitor. The capacitors, in particular, of such conventional DC links represent a significant part of the overall size and weight of the motor drive system and also impact reliability. Such conventional systems are, therefore, large and heavy which are generally undesirable characteristics in many fields, particularly in aerospace applications.

It is therefore desirable to provide effective damping without the use of such large damping circuits. More recently, as disclosed in e.g. U.S. Pat. No. 8,415,914, generator control units have been provided with active damping. Other techniques, e.g. see U.S. Pat. No. 8,669,743 switches a resistor into and out of the drive system for damping. This, however, also requires extra hardware.

Other active damping systems and techniques are known and discussed in the following references [1]-[7]. Generally, those methods are based on measuring dc-link signals, such as the dc-link voltage, and applying compensation signals either into the current control loop, or in the current reference signals, to avoid the negative resistance behaviour of the drive at the frequency of interest. [1] X. Liu, A. Forsyth, and A. Cross, "Negative input-resistance compensator for a constant power load," IEEE Trans. Ind. Electron., vol. 54, no. 6, pp. 3188-3196, 2007. [2] P. Liutanakul, A.-B. Awan, S. Pierfederici, B. Nahid-Mobarakeh, and F. Meibody-Tabar, "Linear stabilization of a dc bus supplying a constant power load: A general design approach," IEEE Trans. Power Electron., vol. 25, no. 2, pp. 475-488, February, 2010. [3] P. Magne, D. Marx, B. Nahid-Mobarakeh, and S. Pierfederici, "Large signal stabilization of a dc-link supplying a constant power load using a virtual capacitor: Impact on the domain of attraction," IEEE Trans. on Ind. Appl., 2012. [4] Mohamed, Y. A.-R. I.; Radwan, A. A. A.; Lee, T. K. "Decoupled Reference-Voltage-Based Active DC-Link Stabilization for PMSM Drives With Tight-Speed Regulation", Industrial Electronics, IEEE Transactions on, On page(s): 4523-4536 Volume: 59, Issue: 12, December 2012. [5] A. Riccobono and E. Santi, "Positive Feedforward Control of Three-Phase Voltage Source Inverter for DC Input Bus Stabilization With Experimental Validation", IEEE Trans. Power Electron. Vol 49, no. 1. pp. 168-177, 2013. [6] Lee, W., Sul, Seung-Ki, "DC-link Voltage Stabilization for Reduced DC-link Capacitor Inverter", IEEE Trans. Ind. App., vo 50, no. 1, January-February 2014. [7] H. Mosskull, "Optimal DC-Link Stabilization Design", IEEE Trans. Ind. Electronics, February 2015.

In these systems, the damping effect created at the input to the motor drive depends on the operating point of the system. In particular, it depends on the duty cycle (influenced by the back electromotive force of the motor) and the torque level. As the performance of the active damping is dependent on torque, no damping effect is achieved in conditions where output voltage and current are low. The present technique aims to ensure the damping effect is achieved at all operating points, including low loads and nominal loads.

There is, therefore, a need for improved active damping over the whole operating range.

SUMMARY

The present disclosure provides a system and method that provides active damping at the input of a motor drive system without the need for the hardware used in conventional RC damping circuits. According to the disclosure a virtual damping network is realised at the input of the motor drive system. More specifically, a control algorithm and associated set points create a virtual damping impedance at the motor drive input.

The disclosure provides a method of providing damping to a motor drive system, comprising determining a flux component and a torque component of a motor drive current; comparing the flux component and torque component with a respective desired flux component and desired torque component; using a controller to provide a motor control output from each comparison; and characterised by adding, to each motor control output, the result of active damping network functions performed on a voltage measured at the input to the motor drive system, and providing a damped motor drive output.

In an embodiment, the desired flux current component is modulated to achieve damping at the input port at all operating conditions, including light load levels and rated load level.

Also provided is a method of providing damping to a motor drive system, comprising determining a flux component and a torque component of a motor drive current; comparing the flux component and torque component with a respective desired flux component and desired torque component; using a controller to provide a motor control output from each comparison; and characterised by adding, to each motor control output, the result of an active damping implemented using transfer function with constant coefficients Ad_d(s) and Ad_q(s) performed on a voltage measured at the input to the motor drive system.

Also provided is an active damping system for a motor drive comprising means for comparing each of a flux component and a torque component of a motor drive current with a respective desired flux component and desired torque component; and a controller arranged to provide a motor control output from the respective comparisons; and further comprising means for performing active damping network functions on voltage measured at the input to the motor drive system, and providing a damped motor drive output.

Also provided is a moto drive comprising a power supply, a power switching circuit between the power supply and one or more loads, and an active damping system as described.

DETAILED DESCRIPTION

Figure 1:
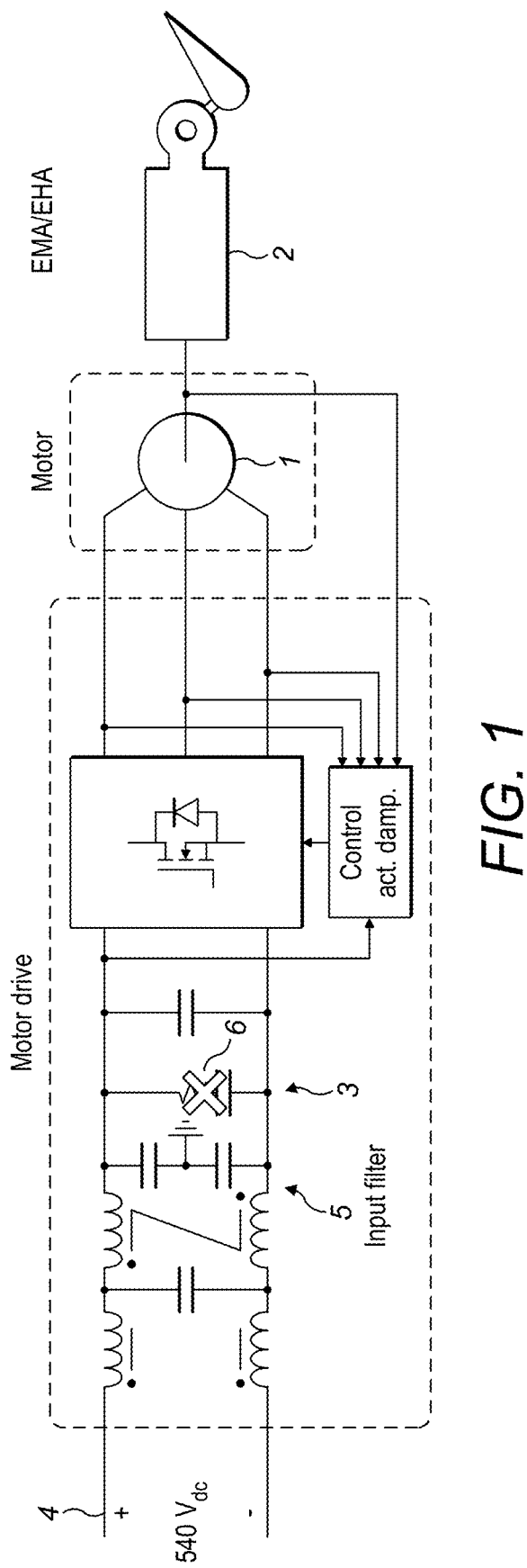
FIG. 1 is a simplified circuit diagram of a DC-fed drive system incorporating the active damping technique of this disclosure.

Referring first to FIG. 1, a typical DC-fed motor drive system can be seen for driving a motor 1 to drive e.g. an actuator 2. The motor is a three-phase motor. The motor drive is a DC-fed system. Therefore, a DC link 3 is provided between the source 4 and the motor drive. Conventionally, as described above, a filter 5 is provided in the DC link, in the form of capacitors and inductors. A damping circuit 6 is also provided—here in parallel with the filter capacitor (other damping realizations are possible). The technique of the present disclosure involves the incorporation of an active damper control to create a virtual impedance at the input of the motor drive and this avoids the need for the damper circuit (shown in FIG. 1 crossed out). A smaller filter capacitor can also be used because of the active control technique of this invention. The power source, in the example shown is a DC source, but this can also be an AC source or DC source of another voltage value.

The control technique of this disclosure takes the voltage across the filter capacitor at the input of the motor drive as an input and also reference d-q motor current, and motor speed, as will be discussed further below.

The technique of this disclosure is a modification of the known field-oriented control (FOC), also known as vector control. In FOC, the stator currents of the three-phase motor are identified as two orthogonal components represented by a vector. The FOC aims to optimise magnetic field of the motor by adjusting the phase of the voltage applied to the motor so as to ensure the current components are at the desired value.

The modified technique of the disclosure will now be explained in more detail with specific reference to FIG. 2.

Figure 2:
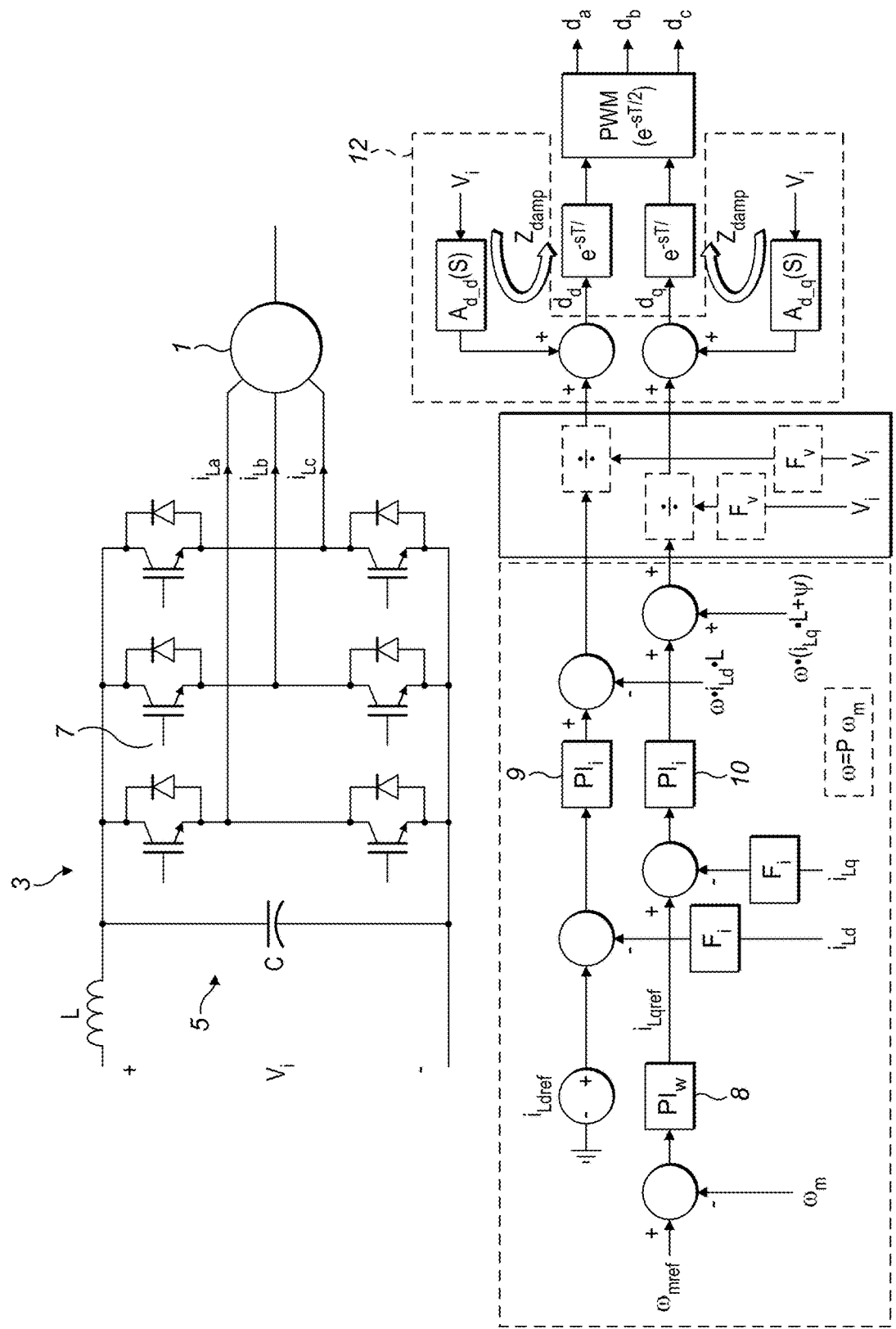
FIG. 2 shows a schematic of the implementation of the active damping control

The top part of FIG. 2 shows a conventional power switching system of a motor drive including the filter capacitor and the switches 7 that provide controlled output to drive one or more motors 1.

The control for active damping is shown in detail in the bottom part of FIG. 2. With reference to FIG. 1, it will be seen that this control will be incorporated across the power switching system.

In the bottom part of FIG. 2, the elements to the left of the drawing, surrounded by dotted lines correspond to elements that are known from conventional FCO. The components towards the middle of the drawings, within full lines, are optional elements as described below. The elements within dashed lines are features required to perform the modified technique of this disclosure. This is clearly just one realisation of the system structure. Note that the elements inside the FOC are represented by transfer functions in continuous time domain, but implementations in discrete domain may be used in practice.

To control the drive of the motor, the motor stator current is separated into two components, a flux or direct component d and a torque component q. A desired motor speed $\omega_{mref}$ is provided as a control input and is compared, in a comparator, with an actual motor speed $\omega_m$. From this, using a proportional integral (PI) controller 8 $PI_w$, a reference or target value for the torque component of the stator current $i_{Lqref}$ is determined. The target flux current component $i_{Ldref}$ is provided as another input to the control system. Other controllers different from PI may be used as well.

The actual d and q components of motor current are then compared, respectively, with the target or reference values and the results of the comparison are provided to respective controller 9, 10 (e.g. PI controllers). The PI outputs are used as duty cycle commands, in d-q frame, (i.e. dd, dq) for a pulse-width modulator (PWM). Scaling factors as a function of input voltage may be used (see division blocks).

In a conventional FOC, the voltage outputs would be pulse width modulated to provide drive outputs to drive the motor. If the system is controlled in this manner, the motor drive system behaves as a constant power load at frequencies within the bandwidth of the control system, i.e. the controller compensates input voltage disturbances so that, if the input voltage increases, the input current decreases so that the power flow into the system is constant. From a dynamic standpoint, a constant power load behaves as a negative resistance, and this may lead to an unstable system unless a relatively large dc-link capacitor or passive damping network is incorporated into the system.

As indicated in the introduction, some methods have been proposed in the literature to mitigate this issue, e.g. see [3] and [4]. The idea is to measure the dc-link voltage, perform convolution through a certain differential equation, and apply a compensation signal into the FOC control so that the negative resistance effect is compensated at the resonance frequency of the LC filter. This way, closed-loop operation of the system can be achieved while the instability problem is addressed. A problem with this approach is that the active damping effect depends on the operating point of the d-q currents and the duty cycle. Depending on the system parameters, this may lead to operating conditions where no active damping effect is achieved, in particular at light loads. This may be problematic in motor drive systems that make use of state-of-the art capacitor and inductor technology to realize an input filter with high Q factors, as this may lead to amplification of oscillations in the DC-bus that could impact the system operation.

The aim of the present technique, as mentioned above, is to achieve active damping at all operating points.

The present technique modifies the above-described FOC by adding an additional input-output dynamic network 12 as shown in the dashed lines in FIG. 2. The DC link voltage measured at the terminals of the DC link filter capacitor is added, via respective linear time invariant transfer functions Ad_d(s) and Ad_q(s) to each of the d and q outputs of the FOC (prior to the PWM). The exponential factor $e^{(-sT)}$ here represents the inherent loop time-delay present in synchronous digital implementations, where T is the sampling period of the loop.

As mentioned above, the dynamic networks for active damping in FIG. 2 are implemented using linear time invariant transfer functions, which can be realized in the discrete domain using a discrete difference equation. However, other realizations may be also possible (e.g. realizations using adaptive coefficients depending on operating point).

Figure 3:
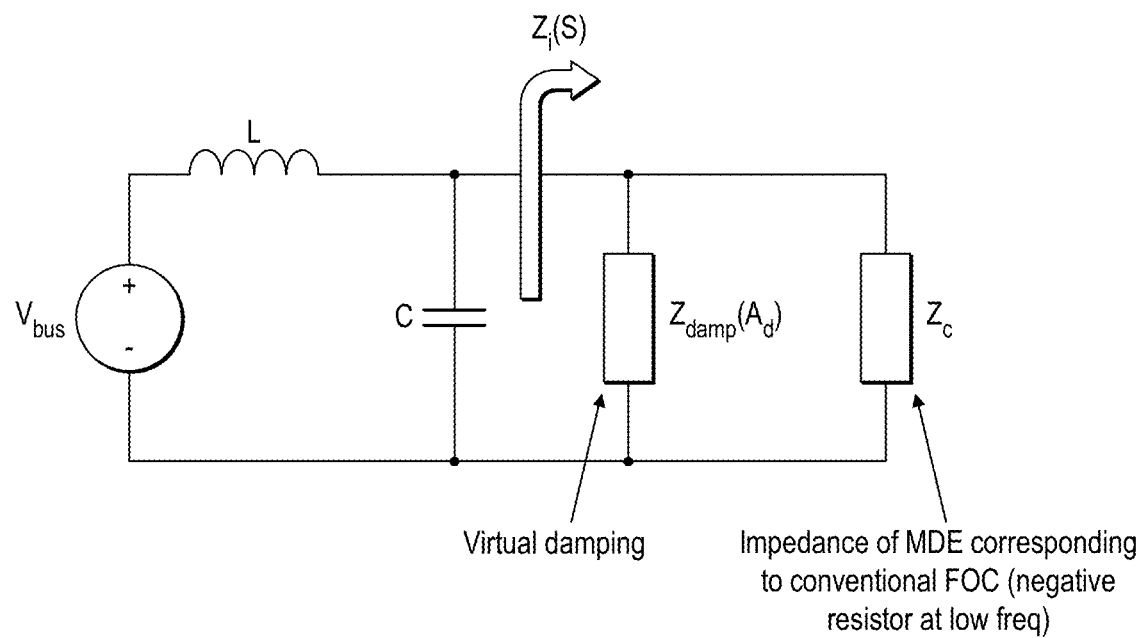
FIG. 3 is a model representing the virtual damping impedance resulting from the active damping technique of the disclosure.
Figure 4:
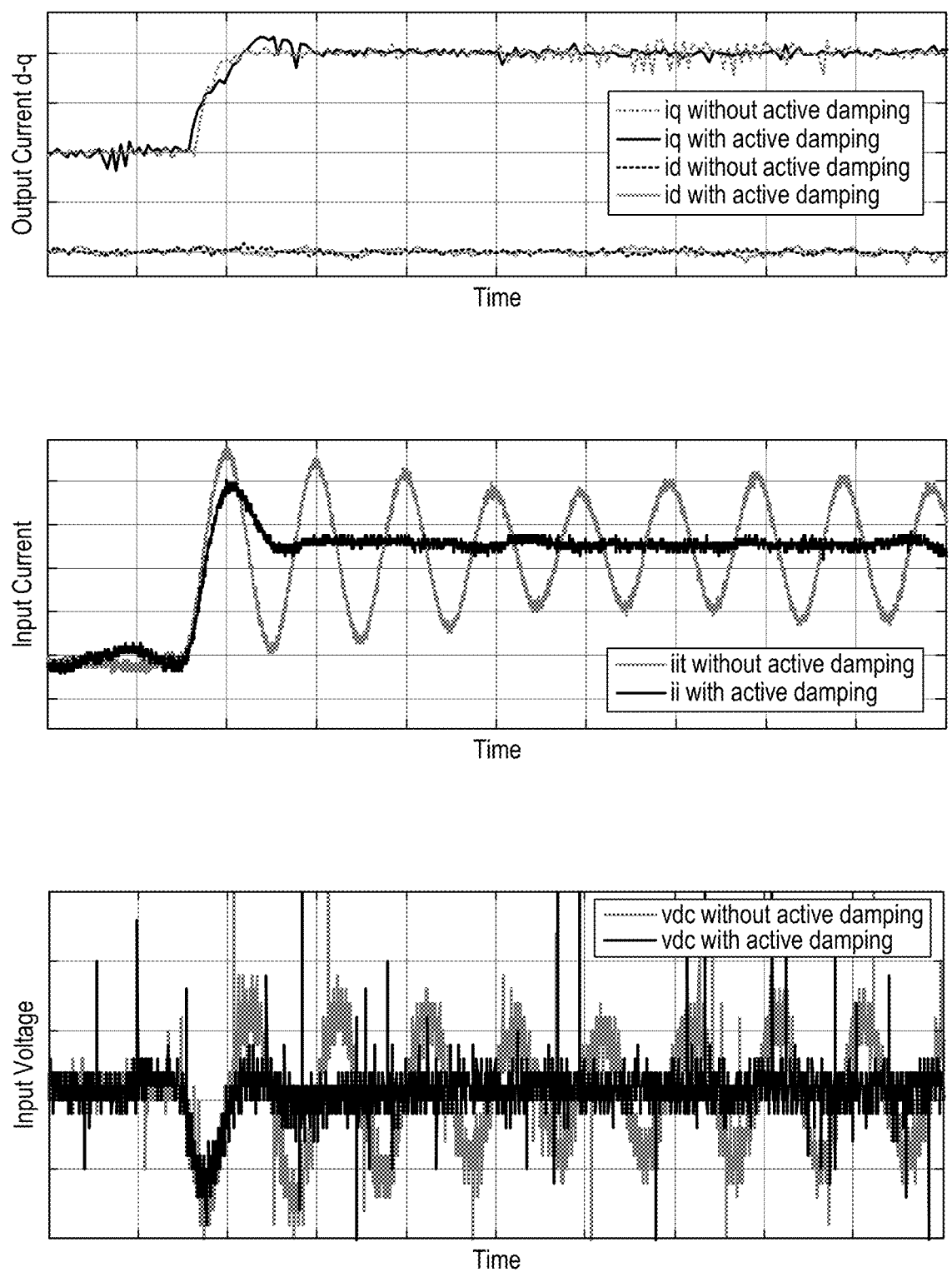
FIG. 4 illustrates the behaviour of the input voltage and input current of a motor drive system connected to a DC bus, with and without active damping.

This modification to FOC introduces a virtual impedance into the control (shown in the model in FIG. 3).

Using the modification of addition of the linear time invariant transfer functions, the input impedance of the motor drive is modified so that constant power load behaviour is not exhibited at the input port of the motor drive, at the resonant frequency of the input filter. Instead, the motor drive exhibits the behaviour of a damping network in parallel with the normal input impedance of the drive using conventional FOC, i.e. emulating a classical passive damping means described above. A model illustrating the concept is shown in FIG. 3.

Figure 5:
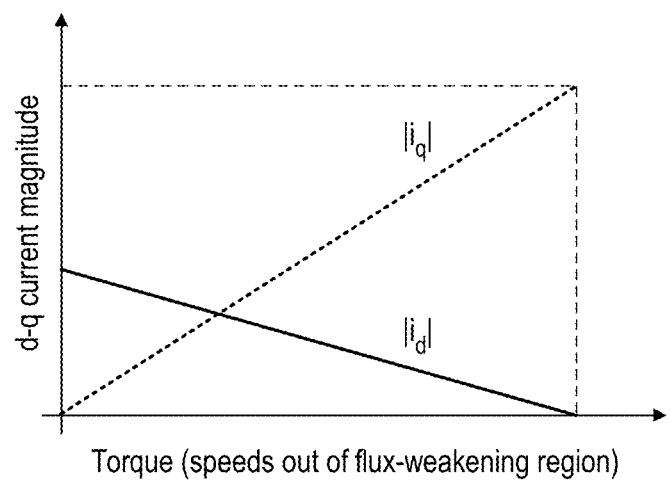
FIG. 5 illustrates a possible implementation of d-q current set points for the proposed active damping method.

Furthermore, as innovation over the state of the art, by modulating the "d" current reference set point of the drive as proposed in this invention at low torque levels and speed levels, the system can actively damp the DC-link at all operating points. The adaptation of set points is illustrated in FIG. 5. When torque is low (i.e. the q component is low), the "d" component is increased, in this modified technique to ensure that the motor drive has damped input impedance at all operating points, and not only at rated power. It is important, particularly in aerospace applications, to handle susceptibility requirements even at low and medium power levels. It should be noted that other means to increase damping performance at light loads may also be applied, e.g. using linear time-variant networks to implement Ad_d and Ad_q and adapting them as a function of the operating point. In FIG. 5, linear evolution of the set points is illustrated with respect to the torque demand, but other evolutions are possible.

Thus, when perturbations are applied in the input voltage at this resonant frequency, the (modified) motor impedance is used to perform damping.

This invention may also be applied to introduce active damping into a plurality of motor drive systems connected in a common DC-bus. In such a scenario, either some of them, or all of them, may be fitted with the proposed active damping method.

Furthermore, the technique could also be fitted with means to detect existence of oscillations in order to enable or disable the active damping.

According to a particular aspect of this disclosure, a new tuning process for the linear time invariant transfer functions Ad_d(s) and Ad_q(s) has also been developed so that the virtual impedance can resemble a desired passive network (e.g. like a conventional parallel RC damping circuit). This tuning process simplifies the design process for engineers as they can use well-established equations for passive damping design, and they can readily predict the expected performance of the drive at the input port, and achieve similar behaviour as obtained by conventional passive dampers.

The tuning process also facilitates prediction of the behaviour of the active damping technique by analytical means. The tuning process developed by the inventors is simple and is described below.

By performing dynamic analysis of the system shown in FIG. 2, expression (1) can be derived for the input admittance of the motor drive system. This expression assumes constant current reference set points, which is a reasonable approximation if the resonance frequency to be damped is well above the bandwidth of the speed loop. The meaning of those parameters is depicted in FIG. 2. $K_{PWM}$ is the gain of the PWM modulator, Fi(s) is the transfer function of the AC current sensor, Fv(s) is the transfer function of the DC-link voltage sensor, ZLd(s) relates to the series inductive impedance of the electrical motor (Ld=Lq in this case for the sake of simplicity). PIi(s) relates to the current controller PIi(s), ILq, ILd represent the operating point of the machine currents in d-q frame, Dd and Dq represent the operating point of the duty cycle in d-q frame, and Vi is the operating point of the DC-link voltage. Td represents the total loop delay. This equation assumes the duty cycles to be scaled as a function of the input voltage. The dependency of the input admittance with respect to the operating point, given by current, duty cycle and input voltage, is clearly seen in this equation.

$$Z_{damp}^{-1}(s)\Big|_{Surface\ PM\ motor} = \qquad (1)$$
$$\left(\frac{A_{d\_q}(s) \cdot (I_{Lq} \cdot Z_L(s) + V_i \cdot D_q) + A_{d\_d}(s) \cdot (I_{Ld} \cdot Z_L(s) + V_i \cdot D_d)}{Z_L(s) + PI_i(s) \cdot F_i(s) \cdot K_{PWM} \cdot e^{-sT_d}}\right) \cdot$$
$$F_v(s) \cdot K_{PWM} \cdot e^{-sT_d}$$

The transfer functions corresponding to the active damping, namely Ad_d(s) and Ad_q(s) can be tuned so that the input admittance, Ydamp(s), resembles a certain admittance defined by the user. If the equivalent circuit illustrated in FIG. 5 is targeted with Zdamp being a parallel RC damper, expressions (2) and (3) results for Ad_d and Ad_q. Those expressions are made up by a term representing the dynamic compensation of the motor drive dynamics, and a second term including the emulated damping impedance.

$$A_{d\_q}(s) = \underbrace{\frac{Z_L(s) + PI_i(s) \cdot F_i(s) \cdot K_{PWM}}{I_{Lq} \cdot Z_L(s) + V_i \cdot D_q}}_{Dynamic\ Compensation} \cdot \frac{1}{F_v(s) \cdot K_{PWM}} \cdot \underbrace{\frac{1}{Z_{emulated\_q}(s)}}_{Emulated\ damping} \qquad (2)$$

-continued $$A_{d\_d}(s) = \underbrace{\frac{Z_L(s) + Pl_i(s) \cdot F_i(s) \cdot K_{PWM}}{I_{Ld} \cdot Z_L(s) + V_i \cdot D_q}}_{\text{Dynamic Compensation}} \cdot \frac{1}{F_v(s) \cdot K_{PWM}} \cdot \underbrace{\frac{1}{Z_{emulated\_d}(s)}}_{\text{Emulated damping}} \quad (3)$$

The result of expressions for the active dampers, given by (2) and (3), can be subsequently simplified for implementation purposes, or expanded with additional filtering effects at low frequency or high frequency depending on particular application needs.

It should be noticed that the expressions used for the active damper, given in (2) and (3), could be either made adaptive as a function of the operating point, or linear time invariant implementations could be used, depending on particular application needs.

Accordingly, the size of the DC link capacitor can be minimized and/or the damping circuitry can be eliminated. This has a significant impact on reliability and size in the motor drive system.

The invention claimed is:

1. A method of providing active damping to a motor drive system, the method comprising:
   determining a flux component and a torque component of a motor drive current;
   comparing the flux component and torque component with a respective desired flux component and desired torque component;
   using a controller to provide a motor control output from each comparison;
   adding, to each motor control output, a result of the active damping implemented using a transfer function with constant coefficients Ad_d(s) and Ad_q(s) performed on a voltage measured at an input to the motor drive system, wherein the coefficients of the transfer function are adapted depending on an operating point;
   pulse width modulating the damped motor drive output to provide a three phase motor drive output; and
   tuning the transfer function, wherein an input admittance of the motor drive system is derived from:

$$Z_{damp}^{-1}(s)\Big|_{Surface\ PM\ motor} = \left( \frac{A_{d\_q}(s) \cdot (I_{Lq} \cdot Z_L(s) + V_i \cdot D_q) + A_{d\_d}(s) \cdot (I_{Ld} \cdot Z_L(s) + V_i \cdot D_d)}{Z_L(s) + Pl_i(s) \cdot F_i(s) \cdot K_{PWM} \cdot e^{-sT_d}} \right) \cdot F_v(s) \cdot K_{PWM} \cdot e^{-sT_d},$$

where $K_{PWM}$ is a gain of a PWM modulator, Fi(s) is the transfer function of an AC current sensor, Fv(s) is the transfer function of a DC-link voltage sensor, ZL(s) relates to a series inductive impedance of an electrical motor, Pli(s) relates to a current controller Pli(s), ILq, ILd represent operating point of the machine currents in d-q frame, Dd and Dq represent operating point of the duty cycle in d-q frame, and Vi is operating point of the DC-link voltage and Td represents a total loop delay, and wherein the transfer function is tuned to achieve a predetermined value for input admittance.

2. The method of claim 1, further comprising:
   adding a function of the voltage measured at the input, to the result of the active damping network functions.

3. The method of claim 1, wherein the motor drive system includes a plurality of motor drives or other three phase voltage source converters.

4. The method of claim 1, further comprising:
   activating or deactivating the damping according to predetermined criteria related to the motor drive system.

5. A method of providing active damping to a motor drive system, the method comprising:
   determining a flux component and a torque component of a motor drive current;
   comparing the flux component and torque component with a respective desired flux component and desired torque component;
   using a controller to provide a motor control output from each comparison;
   adding, to each motor control output, a result of the active damping implemented using a transfer function with constant coefficients Ad_d(s) and Ad_q(s) performed on a voltage measured at an input to the motor drive system, wherein the coefficients of the transfer function are adapted depending on an operating point;
   pulse width modulating the damped motor drive output to provide a three phase motor drive output; wherein:

$$A_{d\_q}(s) = \frac{Z_L(s) + Pl_i(s) \cdot F_i(s) \cdot K_{PWM}}{I_{Lq} \cdot Z_L(s) + V_i \cdot D_q} \cdot \frac{1}{F_v(s) \cdot K_{PWM}} \cdot \frac{1}{Z_{emulated\_q}(s)}$$

$$A_{d\_d}(s) = \frac{Z_L(s) + Pl_i(s) \cdot F_i(s) \cdot K_{PWM}}{I_{Ld} \cdot Z_L(s) + V_i \cdot D_q} \cdot \frac{1}{F_v(s) \cdot K_{PWM}} \cdot \frac{1}{Z_{emulated\_d}(s)}$$

where $K_{PWM}$ is a gain of a PWM modulator, Fi(s) is the transfer function of an AC current sensor, Fv(s) is the transfer function of a DC-link voltage sensor, Zemulated is an emulated damping impedance, Pli(s) relates to a current controller Pli(s), ILq, ILd represent operating point of the machine currents in d-q frame, Dd and Dq represent operating point of the duty cycle in d-q frame, and Vi is operating point of a DC-link voltage and Td represents a total loop delay.

6. The method of claim 5, further comprising:
   adding a function of the voltage measured at the input, to the result of the active damping network functions.

7. The method of claim 5 wherein the motor drive system includes a plurality of motor drives or other three phase voltage source converters.

8. The method of claim 5, further comprising:
   activating or deactivating the damping according to predetermined criteria related to the motor drive system.

* * * * *